(12) United States Patent
Kubota et al.

(10) Patent No.: US 6,647,009 B1
(45) Date of Patent: Nov. 11, 2003

(54) BROADCAST ADDRESS SERVER WITH PHYSICAL ADDRESS DISCRIMINATION FOR BROADCASTING PACKETS

(75) Inventors: Makoto Kubota, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/253,829

(22) Filed: Feb. 19, 1999

(30) Foreign Application Priority Data

Jun. 30, 1998 (JP) .......................................... 10-184013

(51) Int. Cl.[7] .............................................. H04L 12/28
(52) U.S. Cl. ................ 370/390; 370/395.5; 370/395.54
(58) Field of Search ...................... 370/395.1, 396–397, 370/395.2, 395.52, 395.53, 395.54, 401, 389–390, 432, 399, 469, 475; 709/227, 238, 245

(56) References Cited

U.S. PATENT DOCUMENTS

| | | | | |
|---|---|---|---|---|
| 5,600,644 A | * | 2/1997 | Chang et al. ................ | 370/469 |
| 5,774,662 A | * | 6/1998 | Sakagawa ............... | 370/395.54 |
| 6,047,329 A | * | 4/2000 | Horikawa et al. .......... | 370/396 |
| 6,198,747 B1 | * | 3/2001 | Bingham et al. ........... | 370/401 |
| 6,477,708 B1 | * | 11/2002 | Sawa ......................... | 725/116 |

FOREIGN PATENT DOCUMENTS

| | | | | |
|---|---|---|---|---|
| JP | 8-18571 | 1/1996 | | |
| JP | 9-139742 | 5/1997 | | |
| JP | 409331331 A | * | 12/1997 | ........... H04L/12/28 |
| JP | 410065704 A | * | 3/1998 | ........... H04L/12/28 |

OTHER PUBLICATIONS

Armitage, Support for Multicast over UNI 3.0/3.1 based ATM Networks, Internet Draft, pp. 1–83Feb. 22, 1996.*
Salgarellit et al, Supporting IP Multicast Integrated Services in ATM Networks, Internet Draft, pp. 1–20, Nov. 10, 1997.*
Talpade et al, Multicast Server Architecture for MARSbased ATM multicasting, Internet Draft, pp. 1–18, Sep. 17, 1996.*

* cited by examiner

Primary Examiner—Seema S. Rao
Assistant Examiner—Frank Duong
(74) Attorney, Agent, or Firm—Katten Muchin Zavis Rosenman

(57) ABSTRACT

A broadcast address server which can be implemented by slightly modifying an existing address server to make it possible to distribute broadcast packets in a reduced time period. A connection set-up unit establishes, in advance, a broadcast connection extending to all relevant terminals on the network, based on addressing information maintained in the broadcast address server. An address response unit is designed to respond to address resolution requests from the terminals. When a request is received from a particular source terminal that needs a physical address corresponding to a broadcast protocol address, the address response unit returns to the source terminal a dedicated broadcast physical address to be used to receive broadcast packets. Upon receipt of this response, the source terminal transmits a broadcast packet toward the dedicated broadcast physical address. A first packet transmission unit in the broadcast address server receives the broadcast packet and forwards it to the terminals on the network through the broadcast connection, which has previously been established by the connection set-up unit.

13 Claims, 19 Drawing Sheets

| HOST NAME | IP ADDRESS | ATM ADDRESS | | |
|---|---|---|---|---|
| | | Network Prefix | ESI | SEL |
| NHS-A | 192.168.0.1 | 47.0000000000000000000000000000 | 000001111111 | 00 |
| NHS-B | 192.168.0.2 | 47.0000000000000000000000000011 | 000002222222 | 00 |
| NHC-A | 192.168.0.3 | 47.0000000000000000000000000011 | 000003333333 | 00 |
| NHC-B | 192.168.0.4 | 47.0000000000000000000000000011 | 000004444444 | 00 |
| NHC-C | 192.168.0.5 | 47.0000000000000000000000000000 | 000005555555 | 00 |
| NHC-D | 192.168.0.6 | 47.0000000000000000000000000000 | 000006666666 | 00 |

FIG. 3

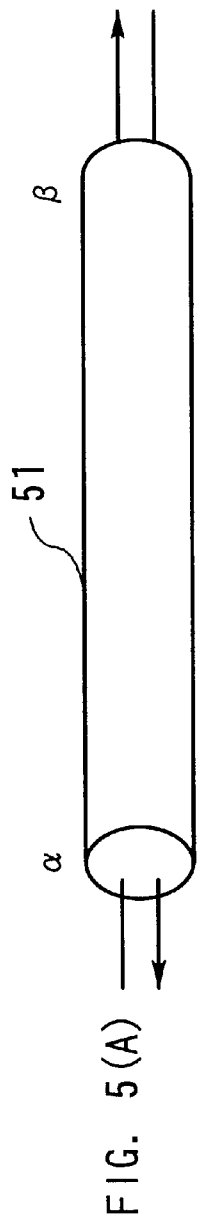
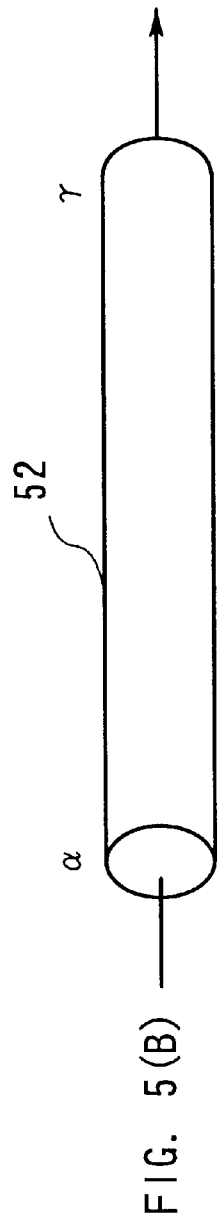
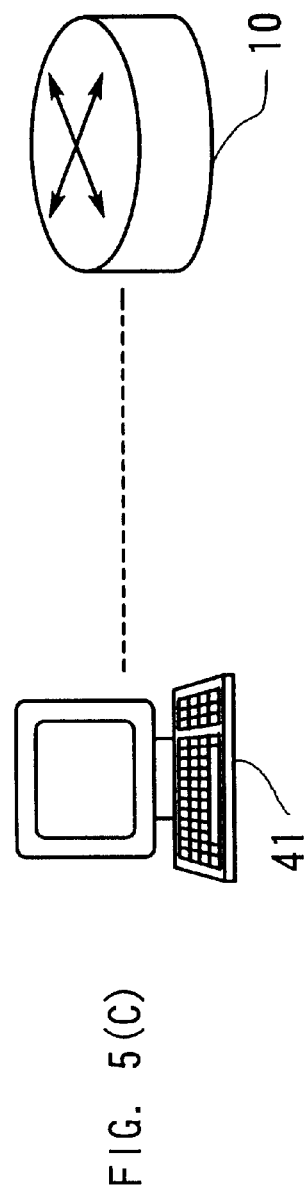
FIG. 5(A)  FIG. 5(B)  FIG. 5(C)  FIG. 5(D)

| HOST NAME IN LIS | IP ADDRESS | ATM ADDRESS |
|---|---|---|
| NHS-A | 192.168.0.1 | 47.0000000000000000000000000011.000001111111.00 |
| NHS-B | 192.168.0.2 | 47.0000000000000000000000000011.000002222222.00 |
| NHS-C | 192.168.0.3 | 47.0000000000000000000000000022.000003333333.00 |
| NHC-A | 192.168.0.4 | 47.0000000000000000000000000011.000004444444.00 |
| NHC-B | 192.168.0.5 | 47.0000000000000000000000000011.000005555555.00 |
| NHC-C | 192.168.0.6 | 47.0000000000000000000000000022.000006666666.00 |
| NHC-D | 192.168.0.7 | 47.0000000000000000000000000022.000007777777.00 |

FIG. 9

| HOST NAME IN LIS | IP ADDRESS | ATM ADDRESS | NUMBER OF ASSOCIATED TERMINALS |
|---|---|---|---|
| NHS-A | 192.168.0.1 | 47.00000000000000000000000011.000001111111.00 | 1 |
| NHS-B | 192.168.0.2 | 47.00000000000000000000000022.000002222222.00 | 0 |
| NHS-C | 192.168.0.3 | 47.00000000000000000000000022.000003333333.00 | 3 |
| NHC-A | 192.168.0.4 | 47.00000000000000000000000011.000004444444.00 | |
| NHC-B | 192.168.0.5 | 47.00000000000000000000000011.000005555555.00 | |
| NHC-C | 192.168.0.6 | 47.00000000000000000000000022.000006666666.00 | |
| NHC-D | 192.168.0.7 | 47.00000000000000000000000033.000007777777.00 | |
| NHC-E | 192.168.0.8 | 47.00000000000000000000000033.000008888888.00 | |
| NHC-F | 192.168.0.9 | 47.00000000000000000000000033.000009999999.00 | |

FIG. 11

| HOST NAME IN LIS | IP ADDRESS | ATM ADDRESS |
|---|---|---|
| NHS-A | 192.168.0.1 | 47.000000000000000000000000000011.000001111111.00 |
| NHS-B | 192.168.0.2 | 47.000000000000000000000000000022.000002222222.00 |
| NHC-A | 192.168.0.4 | 47.000000000000000000000000000033.000004444444.00 |
| NHC-B | 192.168.0.5 | 47.000000000000000000000000000033.000005555555.00 |

FIG. 13

| HOST NAME IN LIS | IP ADDRESS | ATM ADDRESS |
|---|---|---|
| NHS-A | 192.168.0.1 | 47.0000000000000000000000000011.000001111111.00 |
| NHS-B | 192.168.0.2 | 47.0000000000000000000000000011.000004444444.00 |
| NHS-C | 192.168.0.3 | 47.0000000000000000000000000022.000003333333.00 |
| NHC-A | 192.168.0.4 | 47.0000000000000000000000000011.000002222222.00 |
| NHC-B | 192.168.0.5 | 47.0000000000000000000000000011.000005555555.00 |
| NHC-C | 192.168.0.6 | 47.0000000000000000000000000022.000006666666.00 |
| NHC-D | 192.168.0.7 | 47.0000000000000000000000000022.000007777777.00 |

FIG. 15

| HOST NAME IN LIS | IP ADDRESS | ATM ADDRESS | NUMBER OF ASSOCIATED TERMINALS |
|---|---|---|---|
| NHS-A | 192.168.0.1 | 47.00000000000000000000000011.000001111111.00 | 0 |
| NHS-B | 192.168.0.2 | 47.00000000000000000000000011.000004444444.00 | 0 |
| NHS-C | 192.168.0.3 | 47.00000000000000000000000022.000003333333.00 | 4 |
| NHC-A | 192.168.0.4 | 47.00000000000000000000000011.000002222222.00 | |
| NHC-B | 192.168.0.5 | 47.00000000000000000000000011.000005555555.00 | |
| NHC-C | 192.168.0.6 | 47.00000000000000000000000022.000006666666.00 | |
| NHC-D | 192.168.0.7 | 47.00000000000000000000000022.000007777777.00 | |

FIG. 17

FIG. 19(A)
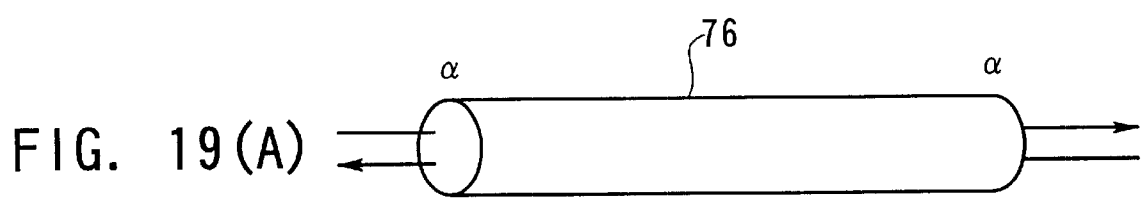
FIG. 19(B)
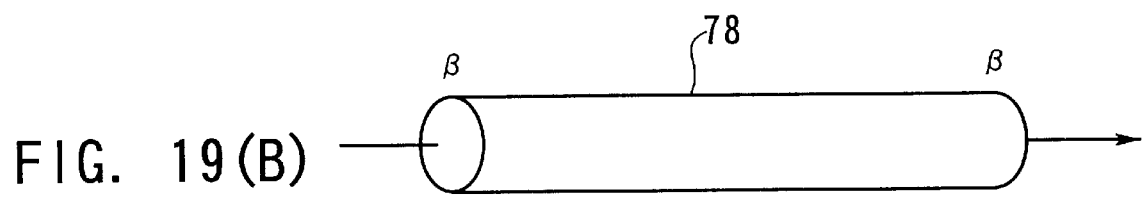
FIG. 19(C)
| SOURCE | DESTINATION |
|--------|-------------|
| α | α |
| β | β |

BROADCAST ADDRESS SERVER WITH PHYSICAL ADDRESS DISCRIMINATION FOR BROADCASTING PACKETS

BACKGROUND OF THE INVENTION

1. Field of the Invention

The present invention relates to a broadcast address server, and more particularly, to a broadcast address server deployed on a network to transfer packets to all relevant terminals on the network.

2. Description of the Related Art

The implementation of classical layer-3 protocols, including the Internet Protocol (IP), in an Asynchronous Transfer Mode (ATM) network environment has been at the forefront of discussion in the Internet Engineering Task Force (IETF) as well as in the ATM Forum. More specifically, the Next Hop Resolution Protocol (NHRP) and the Classical IP over ATM protocol are proposed as important enabling technologies in this field, which make it possible to deliver IP packets to intended destinations over a connection-oriented ATM network.

In such an ATM-based IP network system, there must be at least one address server to provide address resolution services. Each terminal station sets up a connection to the address server, when powered up, and performs a registration procedure to have its protocol address (IP address) and physical address (ATM address) registered to the address server. The address server has an address translation table to store such IP-ATM address pairs of all relevant terminal stations for later use.

When one terminal station wishes to communicate with another terminal station, the source station first sends an address request to the address server to obtain the physical address corresponding to the protocol address a of the destination station. With the obtained physical address, the source station now establishes an ATM connection to the destination, and then starts a communication session through the established ATM connection. The ATM network environments, however, have no special physical address definitions for the purpose of packet broadcasting. Therefore, the address server cannot translate a given broadcast protocol address to any physical address, meaning that some other mechanism is required to make broadcast communication possible.

To solve the above problem in conventional Classical IP over ATM environments, a broadcast server is deployed on the network to support packet relaying services. That is, the broadcast server forwards each incoming broadcast packet toward all terminal stations on the network. To handle those broadcast packets, the broadcast server has an appropriate protocol stack. Every received packet is examined at the protocol layer as to whether the packet is a broadcast packet having a broadcast destination IP address, before distributing it to the terminal stations.

However, the above-described conventional broadcast server has a problem in the time required for packet transfer, because each received packet should be tested not at the physical later, but at the protocol layer. This higher layer process is much more time-consuming, compared to the physical layer process. Another problem with the conventional system is that the broadcast server can be overloaded because all broadcast packets are concentrated on a single server.

SUMMARY OF THE INVENTION

Taking the above into consideration, an object of the present invention is to provide a broadcast address server which can be implemented as an upgraded version of an existing address server to make it possible to distribute broadcast packets in a reduced time period, and with a smaller processing load.

To accomplish the above object, according to the present invention, there is provided a broadcast address server deployed on a network to transmit packets to a plurality of terminals associated therewith. This broadcast address server comprises the following elements: (a) a connection set-up unit which establishes a broadcast connection to the terminals on the network, based on addressing information that is maintained in the broadcast address server; (b) an address response unit which responds to an address resolution request from a source terminal that needs a physical address corresponding to a broadcast protocol address by returning to the source terminal a dedicated broadcast physical address that is used to receive broadcast packets; and (c) a packet transmission unit which receives a broadcast packet that the source terminal has transmitted toward the dedicated broadcast physical address and forwards the received broadcast packet to the terminals on the network.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram which shows an example of an address translation table;

FIG. 5(A) is a diagram which shows a connection for transferring normal packets;

FIG. 5(B) is a diagram which shows a connection for distributing broadcast packets;

FIG. 5(C) is a diagram which shows a terminal (NHC-A) and an address server (NHS-A);

FIG. 5(D) is a table which shows SEL field values as part of ATM addresses β and γ;

FIG. 9 is a diagram which shows an example of an address translation table describing address servers and terminals on the network system of FIGS. 8(A) and 8(B);

FIG. 11 is a diagram which shows an example of an address translation table describing address servers and terminals on the network system of FIGS. 10(A) and 10(B);

FIG. 13 is a diagram which shows an example of an address translation table describing address servers and terminals on the network system of FIGS. 12(A) and 12(B);

FIG. 15 is a diagram which shows an example of an address translation table describing address servers and terminals on the network system of FIGS. 14(A) and 14(B);

FIG. 17 is a diagram which shows an example of an address translation table describing address servers and terminals on the network system of FIGS. 16(A) and 16(B);

FIG. 19(A) is a diagram which shows a connection from ATM address α to ATM address α;

FIG. 19(B) is a diagram which shows a connection from ATM address β to ATM address β; and FIG. 19(C) is a table which shows ATM addresses of the both ends of each connection.

DESCRIPTION OF THE PREFERRED EMBODIMENTS

Nine embodiments of the present invention will be described below with reference to the accompanying drawings.

Figure 1:
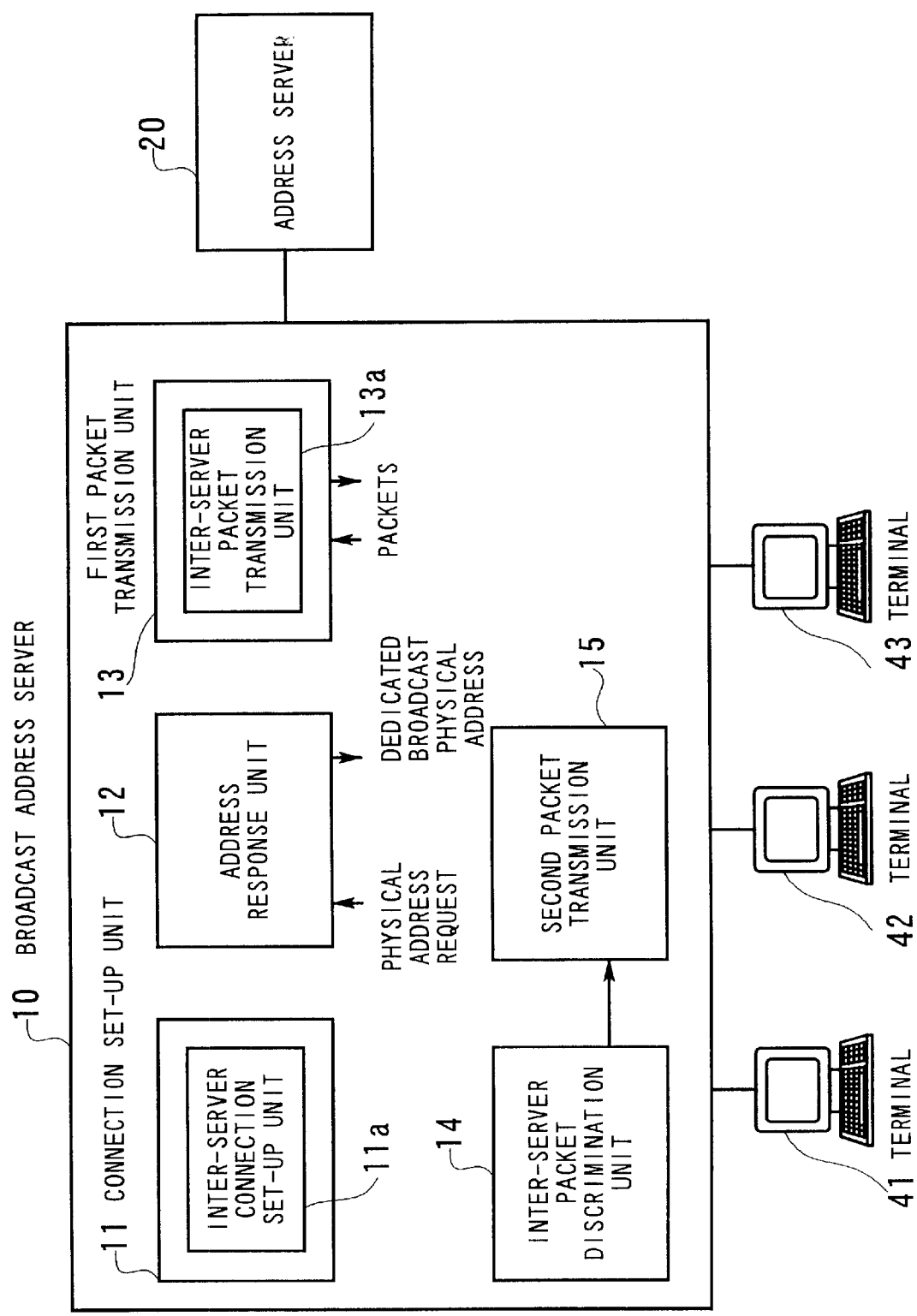
FIG. 1 is a conceptual view of the present invention.

Referring first to FIG. 1, the following section will describe the concept of a broadcast address server 10 according to a first embodiment of the present invention. This broadcast address server 10 comprises a connection set-up unit 11, an address response unit 12, and a first packet transmission unit 13. The connection set-up unit 11 establishes a broadcast connection to the terminals on the network, based on addressing information maintained in the broadcast address server 10. The address response unit 12 is designed to respond to address resolution requests from the terminals. When a request is received from a particular source terminal that needs a physical address corresponding to a broadcast protocol address in an attempt to broadcast a packet, the address response unit 12 returns to the source terminal a dedicated broadcast physical address to be used to receive broadcast packets. When a broadcast packet destined for the dedicated broadcast physical address is received from the source terminal, the first packet transmission unit 13 forwards the received broadcast packet to the terminals on the network through the broadcast connection established by the connection set-up unit 11.

The connection set-up unit 11 comprises an inter-server connection set-up unit 11a to establish a broadcast connection to another broadcast address server, if available on the network, based on the addressing information maintained in the broadcast address server 10. Further, the first packet transmission unit 13 comprises an inter-server packet transmission unit 13a. This inter-server packet transmission unit 13a receives a broadcast packet destined for the dedicated broadcast physical address from the source terminal, and forwards the received broadcast packet to the other broadcast address server through the broadcast connection that has been established by the inter-server connection set-up unit 11a.

The address server 10 further comprises an inter-server packet discrimination unit 14 and a second packet transmission unit 15. The inter-server packet discrimination unit 14 tests each incoming packet to determine whether it is a broadcast packet that has been forwarded from the inter-server packet transmission unit 13a of any other broadcast address server on the network, and if it is, the second packet transmission unit further transmits the packet to the associated terminals.

More specifically, FIG. 1 illustrates that two broadcast address servers (hereafter, "address servers" for short) 10 and 20 are deployed on the network, and that the address server 10 holds member registration records of terminals 41 to 43 as its associated terminals. Although not explicitly shown in FIG. 1, the address server 10 is embodied on a data processing device that comprises a CPU, RAM, ROM, I/O, and other components. Every element shown in FIG. 1 is implemented as a hardware and/or software function of this data processing device. Note here that the other address server 20 has the same configuration as the address server 10.

In operation, the connection set-up unit 11 in the address server 10 establishes a broadcast connection among all terminals and address server(s) on a network for later use, based on the addressing information that it owns in the form of an address translation table. Suppose, for example, that the terminal 41 has sent an address resolution request to its associated address server 10 to request a physical address (i.e., ATM address) corresponding to the broadcast protocol address, in an attempt to broadcast a packet to its intended destinations. Inside the address server 10, the address response unit 12 responds to this request by returning to the requesting terminal 41 a dedicated broadcast physical address that the address server 10 uses solely to accept broadcast packets. Upon receipt of this response, the terminal 41 transmits a broadcast packet toward the address server 10, specifying the dedicated broadcast physical address as the destination address of the packet. The address server 10 receives this broadcast packet and handles it by activating the first packet transmission unit 13. That is, the first packet transmission unit 13 transfers the packet to all the associated terminals and also to the other address server 20 on the same network through the broadcast connection that has previously been established by the connection set-up unit 11.

As described above, the present invention utilizes the existing address servers for packet broadcasting purposes and configures each of them to have a dedicated broadcast physical address to receive broadcast packets from their associated terminals. This means that the broadcast packet distribution can be made solely at the physical layer, as opposed to conventional systems, in which the packets should be processed at the protocol layer for distribution. Therefore, the proposed configuration will greatly reduce the time required to transfer packets.

In the case where a plurality of address servers are deployed on the network, the inter-server connection setting unit 11a, as part of the connection set-up unit 11, extends the broadcast connection to other servers. Based on the addressing information that the address server 10 maintains, the inter-server connection set-up unit 11a establishes a broadcast connection to the other address servers for later use. The inter-server packet transmission unit 13a in the first packet transmission unit 13 is responsible for packet distribution from server to server.

More specifically, when the terminal 41 has sent out a broadcast packet toward the dedicated broadcast physical address of the address server 10. Upon receipt of the broadcast packet, the address server 10 makes its first packet transmission unit 13 distribute the received broadcast packet to all the associated terminals 41 to 43 through the broadcast connection that have been established by the connection set-up unit 11, as described earlier. In addition, the same packet is forwarded by the inter-server packet transmission unit 13a to the other address server 20 through the broadcast connection established by the inter-server connection set-up unit 11a. As will be described later, the above server-to-terminal and server-to-server broadcast connections may actually be a unified point-to-multipoint network connection.

When the address server 10 receives, in turn, a broadcast packet from the other address server 20 through the established broadcast connection, the server packet discrimination unit 14 in the recipient address server 10 determines whether the received packet is a broadcast packet that is forwarded from the second packet transmission unit of any other address server. If this is the case, the second packet transmission unit 15 of the address server 10 will be activated to forward the packet to all the terminals 41 to 43, which are registered as associated terminals of the address server 10.

As clarified above, the present invention proposes that, when a plurality of address servers are present on a network, each address server is only required to distribute incoming broadcast packets to its associated terminals, leaving other terminals to other address servers. Accordingly, the processing load of broadcasting tasks will not be concentrated in one particular address server, but will be distributed across the servers being involved.

The following section will now present more details of the first embodiment of the present invention, particularly illustrating a network system where broadcasting is performed by using the Next Hop Resolution Protocol (NHPR). According to the NHRP terminology, address servers are called "Next Hop Servers" (NHSs), while terminals are referred to as "Next Hop Clients" (NHCs). The Internet Protocol (IP) is used as the layer-3 vehicle in this network system. The network is modeled by using the notion of Logical IP Subnetworks (LISs).

Figure 2:
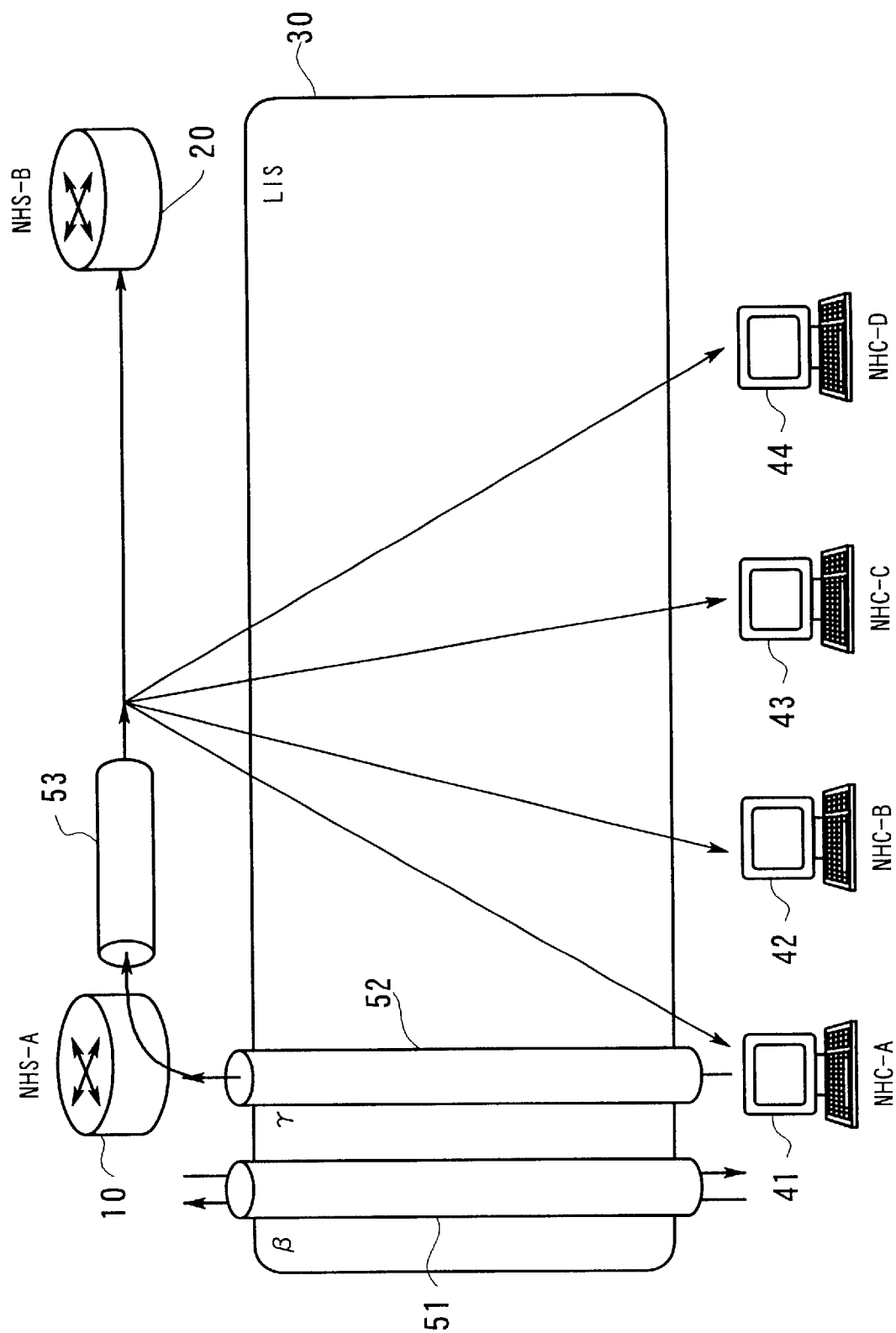
FIG. 2 is a diagram which shows a network system according to a first embodiment of the present invention.

FIG. 2 shows a network system according to the first embodiment of the present invention, where two address servers (NHS-A, NHS-B) 10 and 20 are deployed on a network (LIS) 30. It is assumed that four terminals (NHC-A, NHC-B, NHC-C, NHC-D) 41, 42, 43, and 44 are registered in the address server (NHS-A) 10 as its associated clients.

Although not illustrated in FIG. 2, ATM switches are deployed on the network (LIS) 30 to route ATM cells. The terminal 41 is linked to the address server (NHS-A) 10 vial two paths: a normal connection 51 and a broadcast connection 52. Note that the term "normal" is used here to mean "non-broadcast." There is another broadcast connection 53 established to link the address server (NHS-A) 10 with the remote address server (NHS-B) 20 and the four terminals (NHC-A to NHC-D) 41 to 44.

FIG. 3 shows an example of an address translation table which describes the association between IP addresses and ATM addresses of the address servers and terminals shown in FIG. 2.

Figure 4:
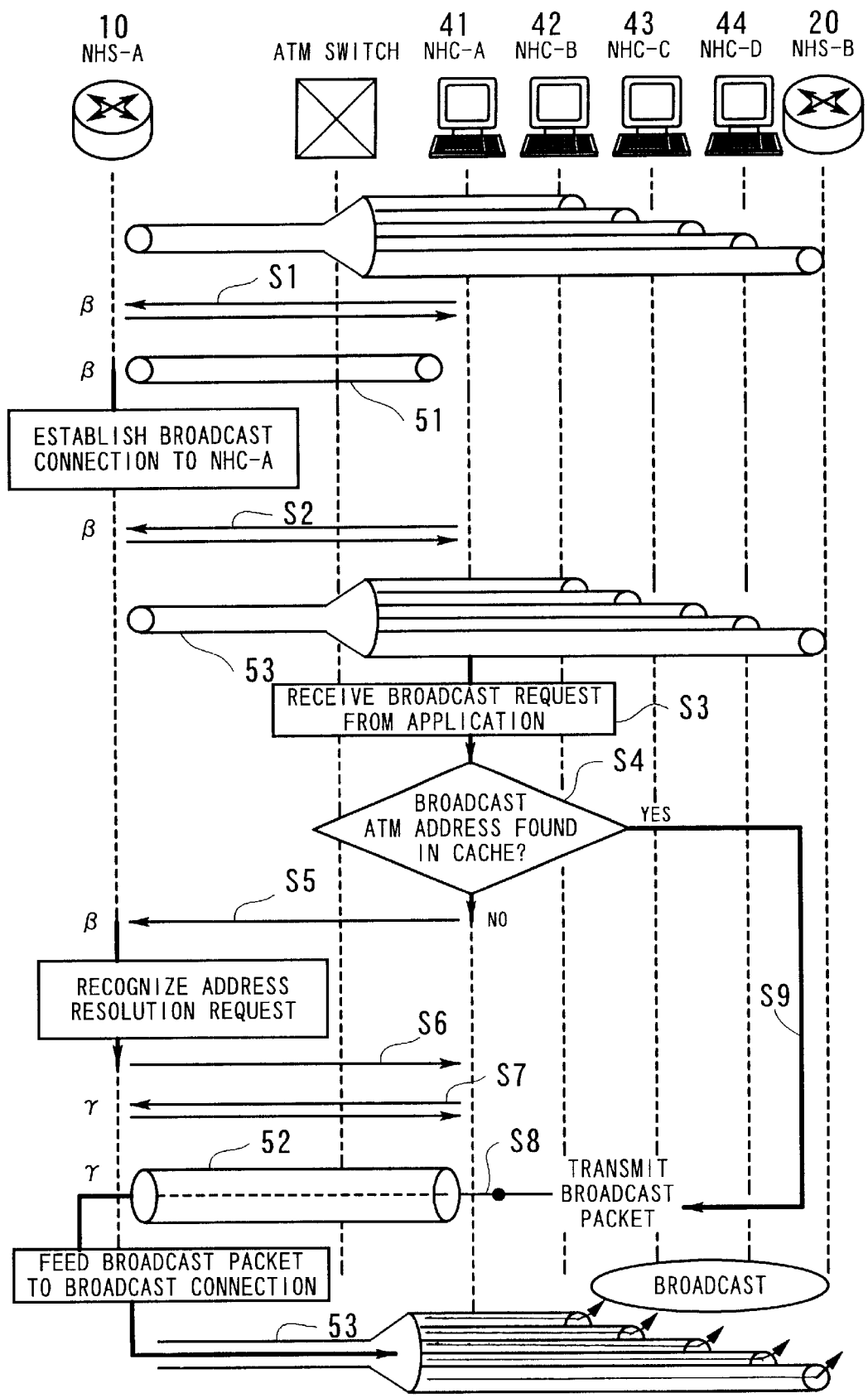
FIG. 4 is a sequence diagram which shows how packets are broadcast from an address server to terminals in the network system of FIG. 2.

FIG. 4 is a sequence diagram which shows how packets are broadcast in the network system of FIG. 2. The following section will present the details of this broadcasting process, referring to the step numbers (S1 to S9) used in FIG. 4. It is assumed here that a network administrator has previously configured the terminals (NHC-A to NHC-D) 41 to 44 to have an ATM address β which permits them to reach their associated address server (NHS-A) 10, and the broadcasting process is set up so that packets will be delivered to all terminals and address server(s) on the network.

Although not shown in FIG. 4, a normal connection and a broadcast connection have already been established from the address server (NHS-A) 10 to the terminals (NHC-B) 42, (NHC-C) 43, and (NHC-D) 44, as well as to the address server (NHS-B) 20. These connections are point-to-multipoint connections that the address server (NHS-A) 10 has established by consulting its address translation table to obtain ATM addresses. Alternatively, they can be established as a collection of individual point-to-point connections.

Suppose here that the terminal (NHC-A) 41 is started up. First, the terminal (NHC-A) 41 sends a connection set-up request to the address server (NHS-A) 10 with an ATM address β (Step S1). This results in a normal connection 51 between the terminal (NHC-A) 41 and the address server (NHS-A) 10.

After that, the address server (NHS-A) 10 sends a broadcast connection set-up request to the terminal (NHC-A) 41 to prepare for later packet broadcasting sessions by setting up another connection to the terminal (NHC-A) 41 (Step S2). As a result of this request, a broadcast connection 53 is established from the address server (NHS-A) 10 to the terminal (NHC-A) 41, terminal (NHC-B) 42, terminal (NHC-C) 43, terminal (NHC-D) 44, and address server (NHS-A) 10.

In addition to the ATM address β for normal packet communication, the address server (NHS-A) 10 provides another ATM address γ for the purpose of discriminating incoming broadcast packets from other normal packets at the physical layer. This notion will be described in more detail below, with reference to FIGS. 5(A) to 5(D).

FIG. 5(A) shows a normal connection 51, while FIG. 5(B) a broadcast connection 52. The terminal (NHC-A) 41 is illustrated on the left-hand side of FIG. 5(C), and the address server (NHS-A) 10 on the right-hand side. As FIGS. 5(A) to 5(C) illustrate, α is the ATM address of the terminal (NHC-A) 41, while β and γ are ATM addresses of the address server (NHS-A) 10. FIG. 5(D) shows that the latter ATM addresses β and γ have different SEL field values. That is, the ATM addresses β and γ share the same address values, except for the SEL field, which is "0" for β and "1" for γ as described below.

Figure 6:
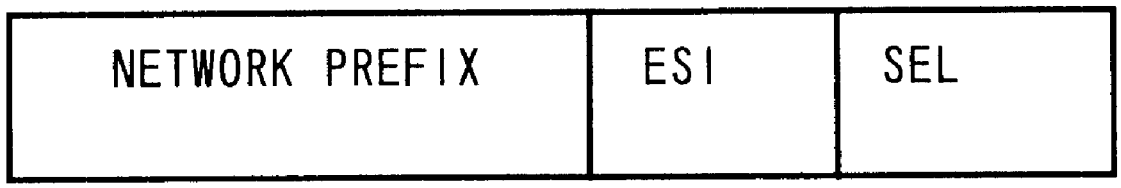
FIG. 6 is a diagram which shows SEL field as part of ATM address format.

FIG. 6 shows the ATM address format for private networks, including the SEL field mentioned above. This address format, defined in some relevant International Organization for Standardization (ISO) standards, consists of the following three data fields: Network Prefix field, ESI (End System Identifier) field, and SEL (Selector) field. Network Prefix field holds a value that is assigned to each private network. ESI field is used to specify an end system dependent value within a private network. SEL field is free for user definitions, and therefore, it is used here to distinguish between the ATM addresses β (normal, or non-broadcast) and γ (broadcast).

Referring back to FIG. 4, it is assumed that the terminal (NHC-A) 41 has received a broadcast request from an application program running on it (Step S3). The terminal (NHC-A) 41 has an IP address for broadcasting, but it may or may not be aware of ATM address γ that the address server (NHS-A) 10 has prepared in advance for broadcasting purposes. If no record of ATM address γ is found in its local address cache, the terminal (NHC-A) 41 sends an address resolution request to the address server (NHS-A) 10 in an attempt to obtain an ATM address relevant to the broadcast IP address (Step S4, S5). This request is delivered through the connection 51, which was established with NHRP protocols at step S1.

Upon receipt of the address resolution request, the address server (NHS-A) 10 returns its own ATM address γ having a SEL field value of "1" to the terminal (NHC-A) 41 (Step S6). Having received this response, the terminal (NHC-A) 41 then sends a request for a broadcast connection to the address server (NHS-A) 10 (Step S7). Note that the terminal (NHC-A) 41 uses the ATM address γ for this request. As a result of the connection set-up process, a broadcast connection 52 is established between the address server (NHS-A) 10 and the terminal (NHC-A) 41. Through this broadcast connection 52, the terminal (NHC-A) 41 now transmits a broadcast packet toward the address server (NHS-A) 10, specifying γ for its destination address (Step S8).

Referring back to step S4, when the broadcast connection 52 is ready and the terminal (NHC-A) 41 has the value of broadcast ATM address γ in its address cache, the terminal (NHC-A) 41 can skip S5 through S7 and immediately transmit a broadcast packet toward the address server (NHS-A) 10 with the broadcast ATM address γ (Step S9).

When a packet is received through the broadcast connection 52, the address server (NHS-A) 10 recognizes it as a broadcast packet and transfers it to all the associated terminals (NHC-A to NHC-D) 41 to 44, as well as to the remote address server (NHS-B) 20, by using the broadcast connection 53 established at step S2. It should be noted that this distribution of the broadcast packet is performed only at the physical layer facilities of the address server (NHS-A) 10.

As described above, the address server of the first embodiment is configured to receive broadcast packets through the broadcast connection 52. Since the broadcast destination ATM address γ is dedicated to the reception of broadcast packets, the address server can handle the received broadcast packets without bringing them to the protocol layer, but solely at the physical layer. The proposed configuration will reduce the time required for packet distribution, compared to conventional systems in which the packets are processed at the protocol layer for distribution. This advantageous broadcasting system in an NHRP network can be implemented by slightly expanding the structure of existing address servers.

Figure 7:
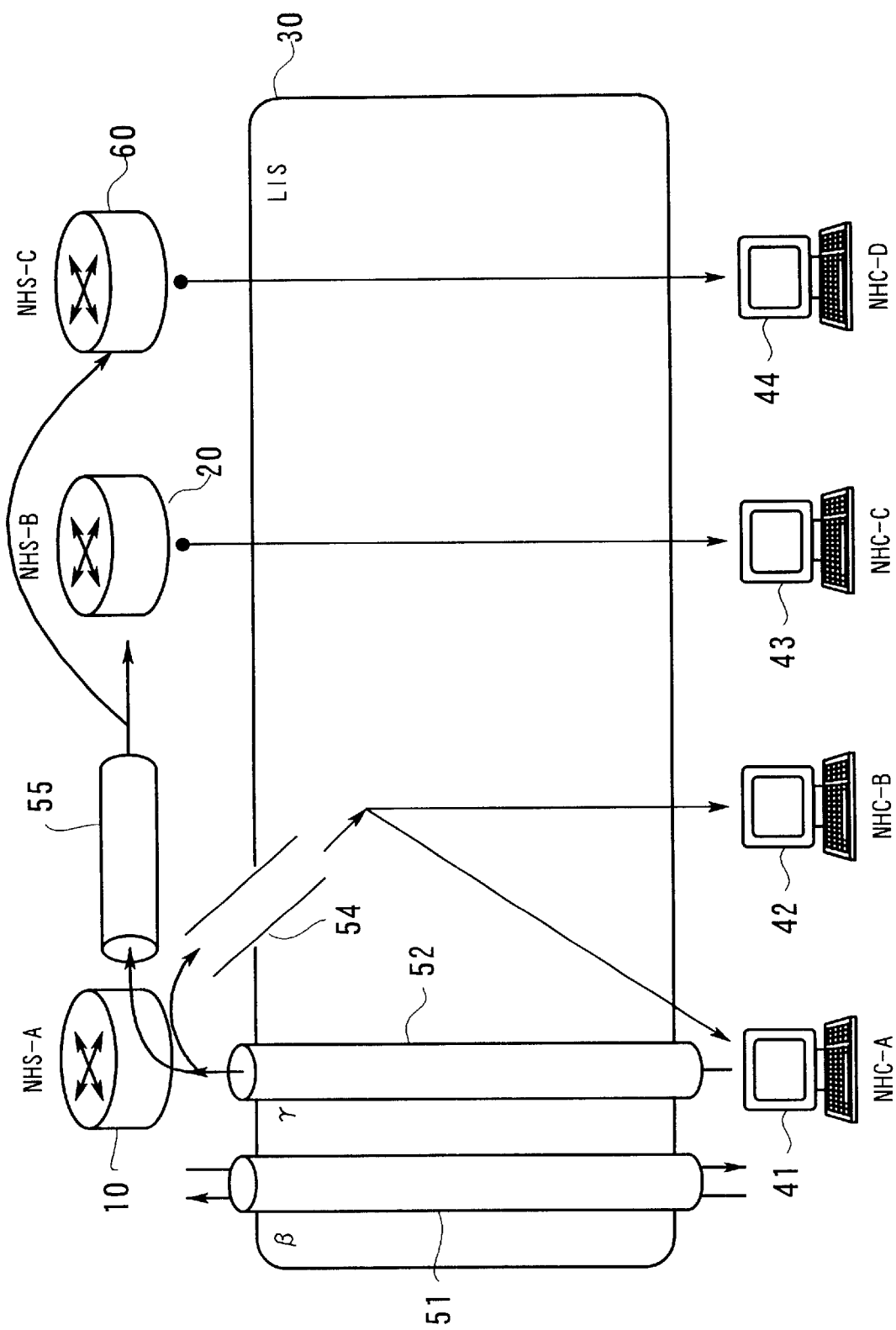
FIG. 7 is a diagram which shows a network system according to a second embodiment of the present invention.

Referring now to FIG. 7, the second embodiment of the present invention will be explained below.

FIG. 7 shows a network system according to the second embodiment. Since this second embodiment has basically the same configuration as the first embodiment, the following section will focus on its distinctive points, while affixing like reference numerals to like elements.

The second embodiment involves a third address server (NHS-C) 60 that is newly deployed on the network (LIS) 30. Further, it is assumed that the terminals (NHS-A, NHS-B) 41 and 42 are associated with the first address server (NHS-A) 10, the terminal (NHC-C) 43 with the second address server (NHS-B) 20, and the terminal (NHC-D) 44 with the third address server (NHS-C) 60. There is a broadcast connection 54 extending from the address server (NHS-A) 10 to the terminals (NHC-A, NHS-B) 41 and 42. This is a point-to-multipoint connection that the address server (NHS-A) 10 has previously established according to its own address translation table. In addition to this, there is another broadcast connection 55 from the address server (NHS-A) 10 to two remote address servers (NHS-B, NHS-C) 20 and 60. It is also a point-to-multipoint connection previously established by the address server (NHS-A) 10.

Suppose that the terminal (NHC-A) 41 is now attempting to broadcast some packets. The terminal (NHC-A) 41 first sends an address resolution request to its associated address server (NHS-A) 10 to obtain an ATM address relevant to the broadcast IP address that it knows. This request is delivered through the connection 51, which has been established for normal packet communication. The address server (NHS-A) 10 responds to this by returning its own ATM address γ having a SEL field value of "1." Receiving the response packet, the terminal (NHC-A) 41 newly sets up a broadcast connection 52 to reach the address server (NHS-A) 10 by using the obtained ATM address γ. Through this broadcast connection 52, the terminal (NHC-A) 41 transmits a broadcast packet toward the address server (NHS-A) 10.

When the packet is received through the broadcast connection 52, the address server (NHS-A) 10 recognizes it as a broadcast packet and transfers it to the registered terminals (NHC-A, NHC-B) 41 and 42. The address server (NHS-A) 10 also transfers the packet to the other address servers (NHS-B, NHS-C) 20 and 60 through the inter-server broadcast connection 55.

The address servers (NHS-B, NHS-C) 20 and 60 each examine the source IP address of the received packet that they received. The value of the source IP address will tell them that the broadcast packet has originated not from a terminal, but from an address server. The address servers (NHS-B, NHS-C) 20 and 60 then forwards the packet to their respective associated terminals. In this way, all terminals on the network will safely receive the same broadcast packet without duplication.

As illustrated above, the present invention proposes that, when a plurality of address servers are deployed on a network, each address server is only required to distribute the received broadcast packets to its associated terminals, leaving other terminals to other address servers. Accordingly, the processing load of packet broadcasting will never be concentrated at one particular address server, but will be distributed across the servers being involved.

Now, the next section will describe a third embodiment of the present invention. Since this third embodiment has basically the same structure as the second embodiment, the following section assumes the aforementioned system configuration of FIG. 7.

In the third embodiment, each address server has the following three ATM addresses: an ATM address with a SEL field value of "0" to receive normal packets, another ATM address with a SEL field value of "1" to receive broadcast packets from terminals, and still another ATM address with a SEL field value of "2" to receive broadcast packets from remote address servers. The following explanation will focus on the elements and features that are different from the second embodiment. For other elements, see the second embodiment described earlier.

The address server (NHS-A) 10 consults its local address translation table to find the ATM address assigned to the address server (NHS-B) 20, and then establishes a connection to the address server (NHS-B) 20 with the obtained ATM address. With this connection, the address server (NHS-A) 10 sends an address resolution request to the address server (NHS-B) 20, seeking an ATM address corresponding to the broadcast IP address that it only knows.

Upon receipt of this address resolution request, the address server (NHS-B) 20 determines whether the source of the received request packet (i.e., the requester) is an address server or a terminal. This test is performed by extracting the source IP address or source ATM address from the body of the received request packet and comparing it with each entry of the address translation table that the address server (NHS-B) 20 maintains. Alternatively, the requester can be identified by examining information extracted from the source address field of the packet header, or by investigating the connection used to deliver the request packet to find out what ATM address is assigned to the origin of the connection.

When the requester turns out to be a remote address server, the address server (NHS-B) 20 returns its own ATM address δ1 with a SEL field value of "2" to the requesting address server (NHS-A) 10. Further, the address server (NHS-A) 10 interacts with the address server (NHSC) 60 in the same manner, thus obtaining the address server (NHS-C) 60's ATM address δ2 with a SEL field value of "2." The address server (NHS-A) 10 then creates a point-to-multipoint connection to the other two address servers (NHS-B, NHS-C) 20 and 60, whose endpoint ATM addresses are δ1 and δ2, respectively. In this way, an inter-server broadcast connection 55 is established.

When a broadcast packet with the destination ATM address γ is received through the broadcast connection 52, the address server (NHS-A) 10 transfers the packet to its associated terminals (NHC-A, NHC-B) 41 and 42, as well as forwarding the same packet to the other address servers (NHS-B, NHS-C) 20 and 60 through the inter-server broadcast connection 55.

Upon receipt of the packet having the destination ATM address δ1, the address server (NHS-B) 20 recognizes it as a broadcast packet at the physical layer. The address server (NHS-B) 20 then transfers the received broadcast packet to its associated terminal (NHC-C) 43 through a connection that has previously been established. Similarly, the address server (NHS-C) 60 receives the packet with the destination ATM address δ2, and recognizes it as a broadcast packet at the physical layer. The address server (NHS-C) 60 then transfers the received broadcast packet to its associated terminal (NHC-D) 44 through a connection that has previously been established.

In the above-described third embodiment, the remote address servers 20 and 60 receive broadcast packets through the broadcast connection 55. Since the destination ATM addresses δ1 and δ2 used in this packet transmission are dedicated to broadcasting, the recipient address servers can recognizes the received packets as broadcast packets solely at the physical layer. Therefore, those recipient address servers can quickly forward the packets to their respective associated terminals.

The next section will describe a fourth embodiment of the present invention.

Figures 8A, 8B:
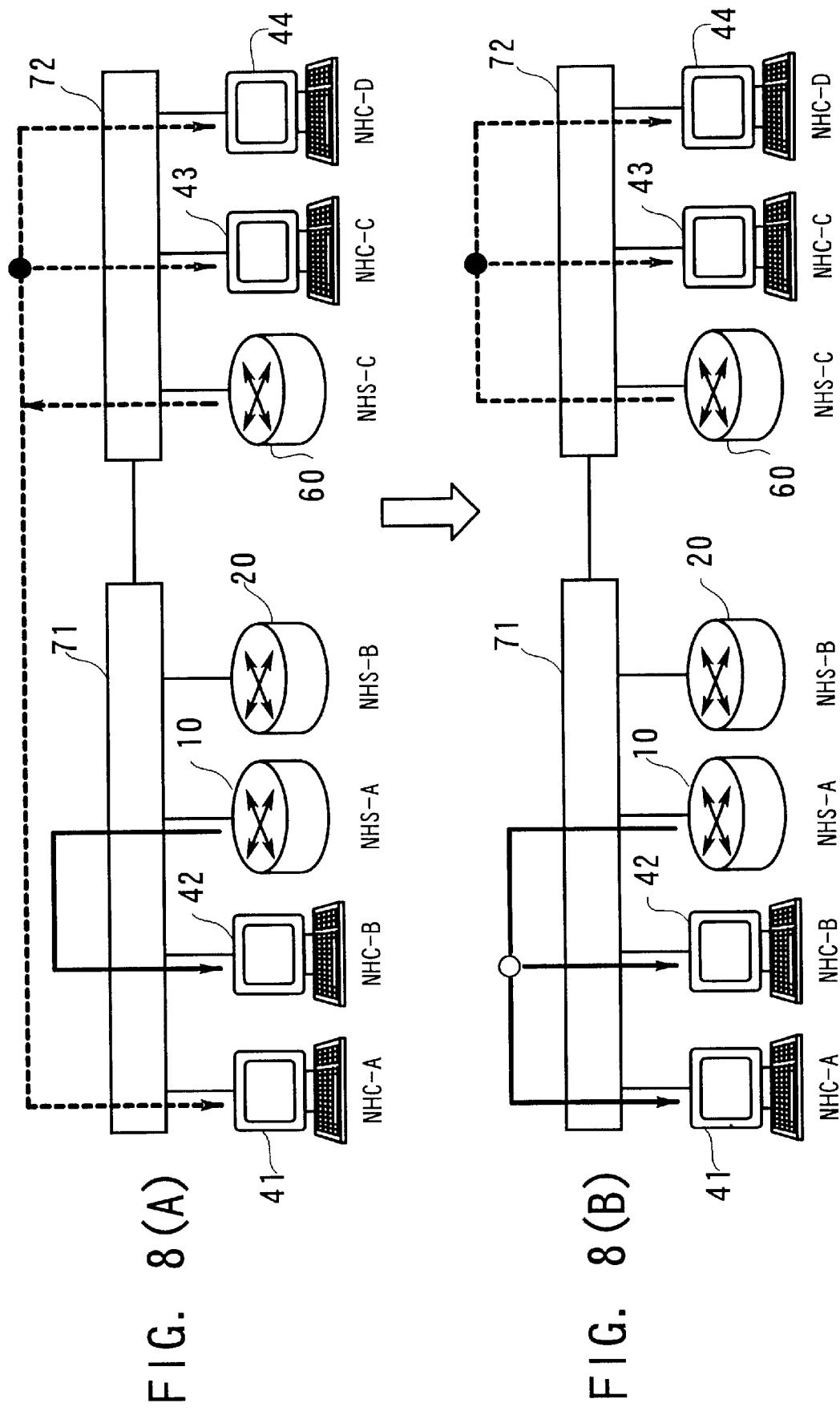
FIG. 8(A) is a diagram which shows a network system according to a fourth embodiment of the present invention, where the initial server-terminal associations are illustrated.
FIG. 8(B) is a diagram which shows the network system of the fourth embodiment, where new server-terminal associations are illustrated.

FIGS. 8(A) and 8(B) show a network system according to the fourth embodiment. More particularly, FIG. 8(A) illustrates the initial state of server-terminal associations, while FIG. 8(B) shows another situation where the server-terminal associations are changed. Since this fourth embodiment has basically the same configuration as the second embodiment, the following section will focus on its distinctive points, while affixing like reference numerals to like elements.

Initially, the terminal (NHC-B) 42 is registered to the address server (NHS-A) 10 as indicated by a solid arrow, while other terminals (NHC-A, NHC-C, NHC-D) 41, 43, and 44 are registered to the address server (NHS-C) 60 as indicated by broken arrows. The address server (NHS-B) 20 has no registrations of associated terminals. An ATM switch 71 is employed in this network system to physically interconnect the terminals (NHC-A, NHC-B) 41 and 42 and the address servers (NHC-A, NHS-B) 10 and 20. There is another ATM switch 72 to interconnect the terminals (NHC-C, NHC-D) 43 and 44 and the address server (NHS-C) 60.

It is undesirable, however, for any server-terminal connection to extend across two different ATM switches, since such a connection imposes a high processing load on the ATM switches. In the fourth embodiment, the server-terminal associations are reconfigured so that no such connections will appear in the system.

Referring back to FIG. 6, the ATM address format implies that the Network Prefix field uniquely identifies a group of terminals and address servers that are connected to the same ATM switch. Using this nature of ATM address, each address server searches its address translation table to find a terminal that is registered to an address server having a different field value of Network Prefix. Such a terminal, if found, should be reregistered to some other address server that shares the same Network Prefix field value with the terminal.

FIG. 9 shows an example of an address translation table that describes address servers and terminals on the network system of FIGS. 8(A) and 8(B). Referring to this FIG. 9, together with FIG. 8(A), the following section will describe how the address servers will reconfigure the server-terminal associations.

First, the address servers (NHS-A, NHS-B, NHS-C) 10, 20, and 60 obtain ATM addresses of all terminals and servers on the same network by consulting their address translation table of FIG. 9. The servers then examine the Network Prefix field of each entry of the table to search for a terminal that is registered to an address server having a different Network Prefix field value. In the example of FIG. 9, the terminal (NHC-A) 41 meets the search criteria.

Next, the servers attempt to find an appropriate address server that has the same Network Prefix field value as the terminal (NHC-A) 41's. In the present context, two address servers (NHS-A, NHS-B) 10 and 20 turn out to be relevant. To narrow down the candidates to one, their ATM address values are compared with each other, and the address server (NHS-A) 10 having a smaller ATM address is selected. According to this selection, the address server (NHS-A) 10 registers the terminal (NHC-A) 41 as its associated terminal, as shown in FIG. 8(B). The address server (NHS-C) 60, on the other hand, deregisters the terminal (NHC-A) 41 from its group. In this way, the address servers redefine their server-terminal associations, thus solving the problem of inappropriate connections extending across the two ATM switches 71 and 72.

Although the address server having the smallest ATM address is selected in the above-described process of narrowing down the candidates, the fourth embodiment is not restricted to this specific selection method. Alternatively, it is possible to choose an address server having the largest ATM address. It may also be possible to select an address server ranked at a particular position when the candidates are sorted in ascending order of ATM address values.

Now, the next section will describe a fifth embodiment of the present invention.

Figure 10A:
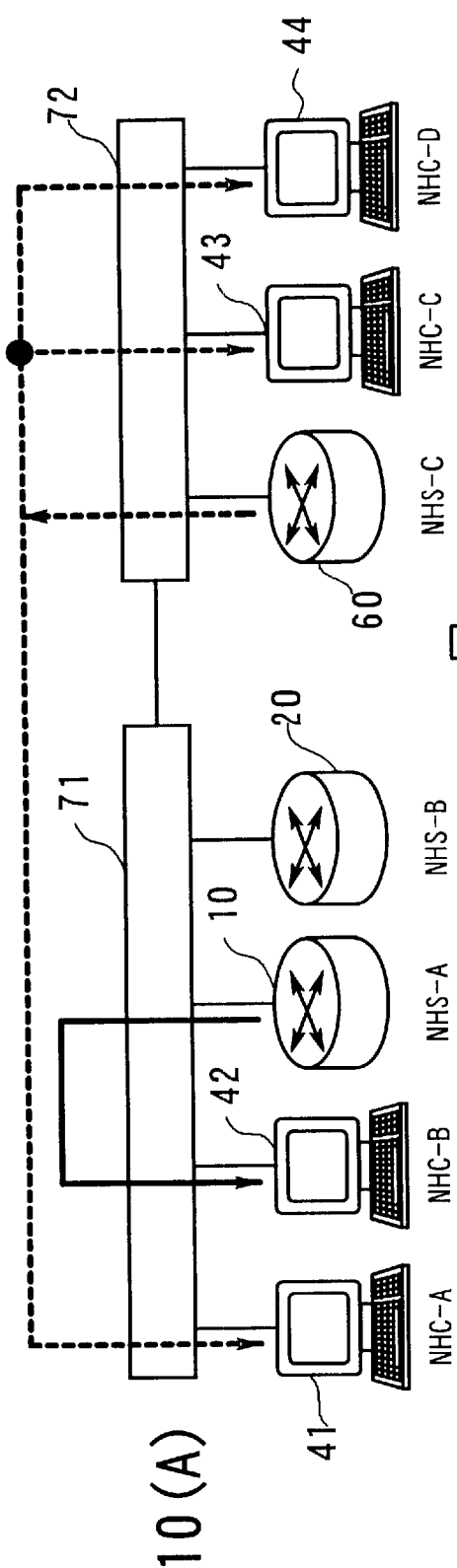
FIG. 10(A) is a diagram which shows a network system according to a fifth embodiment of the present invention, where the initial server-terminal associations are illustrated.
Figure 10B:
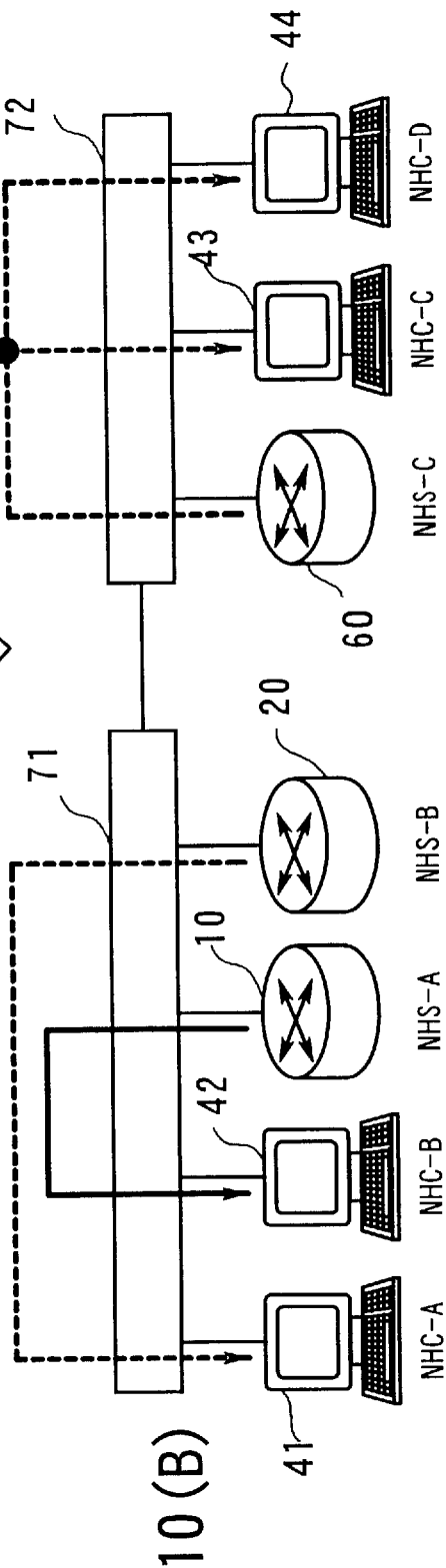
FIG. 10(B) is a diagram which shows the network system of the fifth embodiment, where new server-terminal associations are illustrated.

FIGS. 10(A) and 10(B) show a network system according to the fifth embodiment. More particularly, FIG. 8(A) illustrates the initial state of server-terminal associations, while FIG. 8(B) shows another situation where the server-terminal associations are changed. While having basically the same configuration as the fourth embodiment, this fifth embodiment is distinct in its implementation of the address translation table. More specifically, the address translation table in the fifth embodiment has an additional column to record the number of terminals being associated with each address server.

FIG. 11 shows an example of an address translation table describing the address servers and terminals on the network system of FIGS. 10(A) and 10(B). Referring to this FIG. 11, together with FIG. 10(A), the following section will describe how the address servers will modify their server-terminal associations.

First, the address servers (NHS-A, NHS-B, NHS-C) 10, 20, and 60 obtain ATM addresses of all terminals and servers on the same network by consulting the address translation table of FIG. 11. The servers then examine the Network Prefix field of each entry of the table to search for a terminal that is registered to an address server having a different Network Prefix field value. In the example of FIG. 11, the terminal (NHC-A) 41 meets the search criteria.

Next, the servers attempt to find an appropriate address server that has the same Network Prefix field value as the terminal (NHC-A) 41's. In the present context, two address servers (NHS-A, NHS-B) 10 and 20 turn out to be relevant candidates. To narrow down the candidates to one, the numbers of registered terminals (see the fourth column of the address translation table of FIG. 11) are compared with each other, and the address server (NHS-B) 20 with the smallest number of associated terminals is selected.

According to this selection result, the address server (NHS-B) 20 registers the terminal (NHC-A) 41 as its associated terminal, as shown in FIG. 8(B). The address server (NHS-C) 60, on the other hand, deregisters the terminal (NHC-A) 41 from its group. In this way, the address servers redefine their respective server-terminal associations, thus solving the aforementioned problem of inappropriate connections extending across two or more ATM switches.

Although the address server with the fewest associated terminals is selected to narrow down the candidates in the above process, the fifth embodiment is not restricted to this specific selection method. Alternatively, it is possible to choose an address server with the largest number of terminals. It is also possible to select an address server ranked at a particular position when the candidates are sorted in ascending order of the number of associated terminals. Further, the system can be configured to test the ATM address values to determine the most appropriate server, when there are two or more candidates having the same number of associated terminals.

The next section will describe a sixth embodiment of the present invention.

Figure 12:
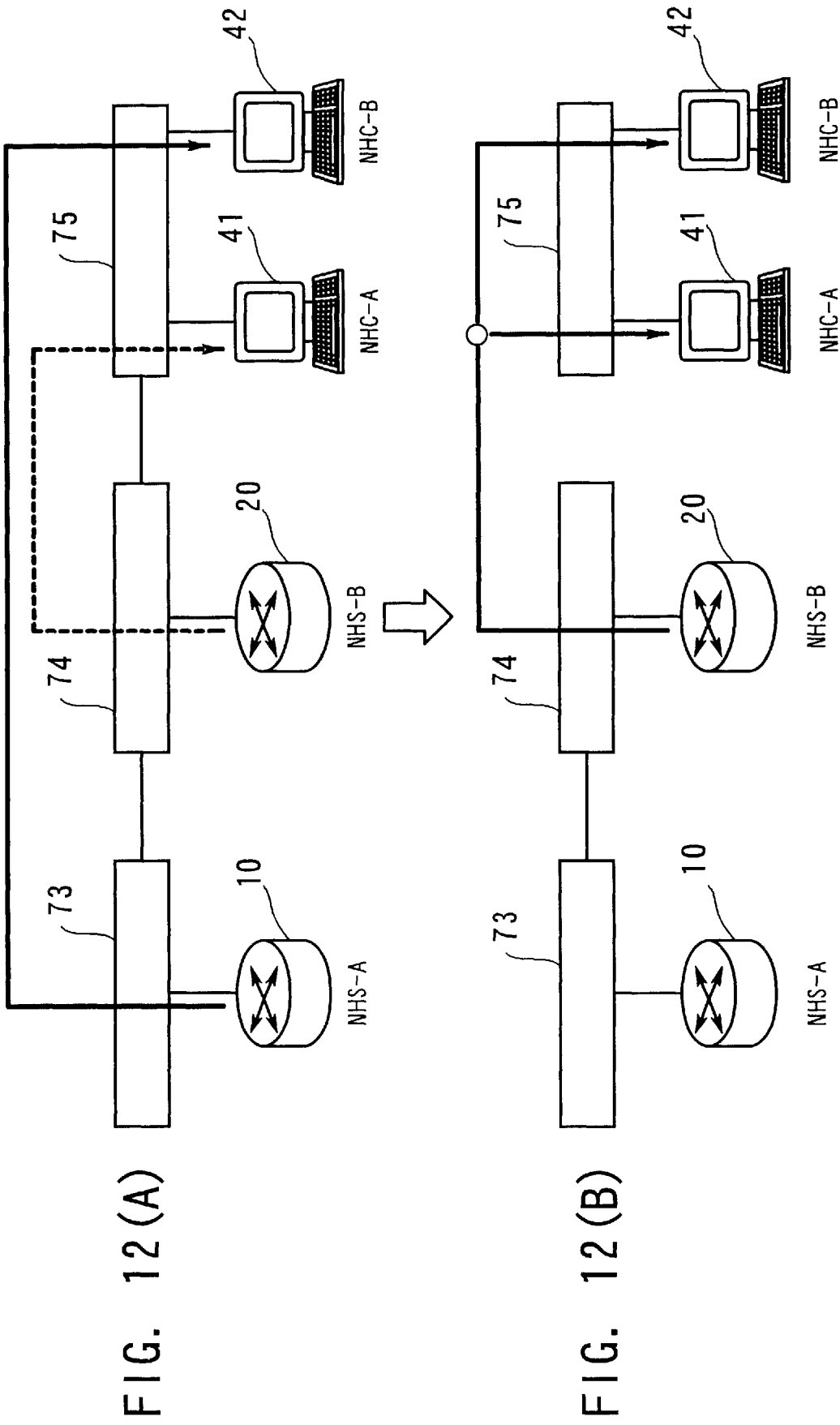
FIG. 12(A) is a diagram which shows a network system according to a sixth embodiment of the present invention, where the initial server-terminal associations are illustrated.
FIG. 12(B) is a diagram which shows the network system of the sixth embodiment, where new server-terminal associations are illustrated.

FIGS. 12(A) and 12(B) show a network system according to the sixth embodiment. More particularly, FIG. 12(A) illustrates the initial state of server-terminal associations, while FIG. 12(B) shows another situation where the server-terminal associations are changed. Since this sixth embodiment has basically the same configuration as the second embodiment, the following section will focus on its distinctive points, while affixing like reference numerals to like elements.

Initially, the terminal (NHC-B) 42 is registered to the address server (NHS-A) 10 as indicated by a solid arrow, and the other terminal (NHC-A) 41 is registered to the address server (NHS-B) 20 as indicated by a broken arrow. The address server (NHC-A) 10 is coupled to an ATM switch 73, while the address server (NHS-B) 20 is connected to another ATM switch 74. The terminals (NHC-A, NHC-B) 41 and 42 are connected to still another ATM switch 75.

It is undesirable, however, for any server-terminal connections to extend across different ATM switches, since such connections could impose a high processing load on the ATM switches. The sixth embodiment is intended to reduce the number of connections in this undesired condition by changing the server-terminal associations.

FIG. 13 is a diagram which shows an example of an address translation table describing address servers and terminals on the network system of FIGS. 12(A) and 12(B).

Referring to this FIG. 13, together with FIG. 12(A), the following section will describe how the address servers will modify their server-terminal associations.

First, the address servers (NHS-A, NHS-B) 10 and 20 obtain the ATM addresses of all terminals and servers on the same network by consulting the address translation table of FIG. 13. The servers then examine the Network Prefix field of each entry of the table to search for a terminal whose Network Prefix field value does not coincide with any address server's. In the example of FIG. 13, both terminals (NHC-A, NHC-B) 41 and 42 meet this criterion.

The servers then determine to which address server(s) the terminals (NHC-A, NHC-B) 41 and 42 should be registered. More specifically, they examine the ATM addresses of all address servers on the network and find the one having the largest ATM address. In the present context, the address server (NHS-B) 20 is selected as their new associated address server.

According to the above selection result, the address server (NHS-B) 20 registers the terminals (NHC-A, NHC-B) 41 and 42 as its associated terminals, as shown in FIG. 12(B). The address server (NHS-A) 10, on the other hand, deregisters the terminal (NHC-B) 42 from its group. In this way, the address servers redefine their server-terminal associations to solve the aforementioned problem of inappropriate connections extending across two or more ATM switches.

Although the address server having the largest ATM address value is selected as a new associated server in the above-described process, the sixth embodiment is not restricted to this specific selection method. Alternatively, it is possible to choose an address server having the smallest ATM address. It is also possible to select an address server ranked at a particular position when the candidates are sorted in ascending order of ATM address values. Furthermore, instead of examining ATM address values of address servers, it is possible to choose a candidate server(s) on the basis of the number of associated terminals. If there are two or more candidates having the same number of associated terminals, the system then tests their ATM address values to determines an appropriate address server.

The following section will now describe a seventh embodiment of the present invention.

Figures 14A, 14B:
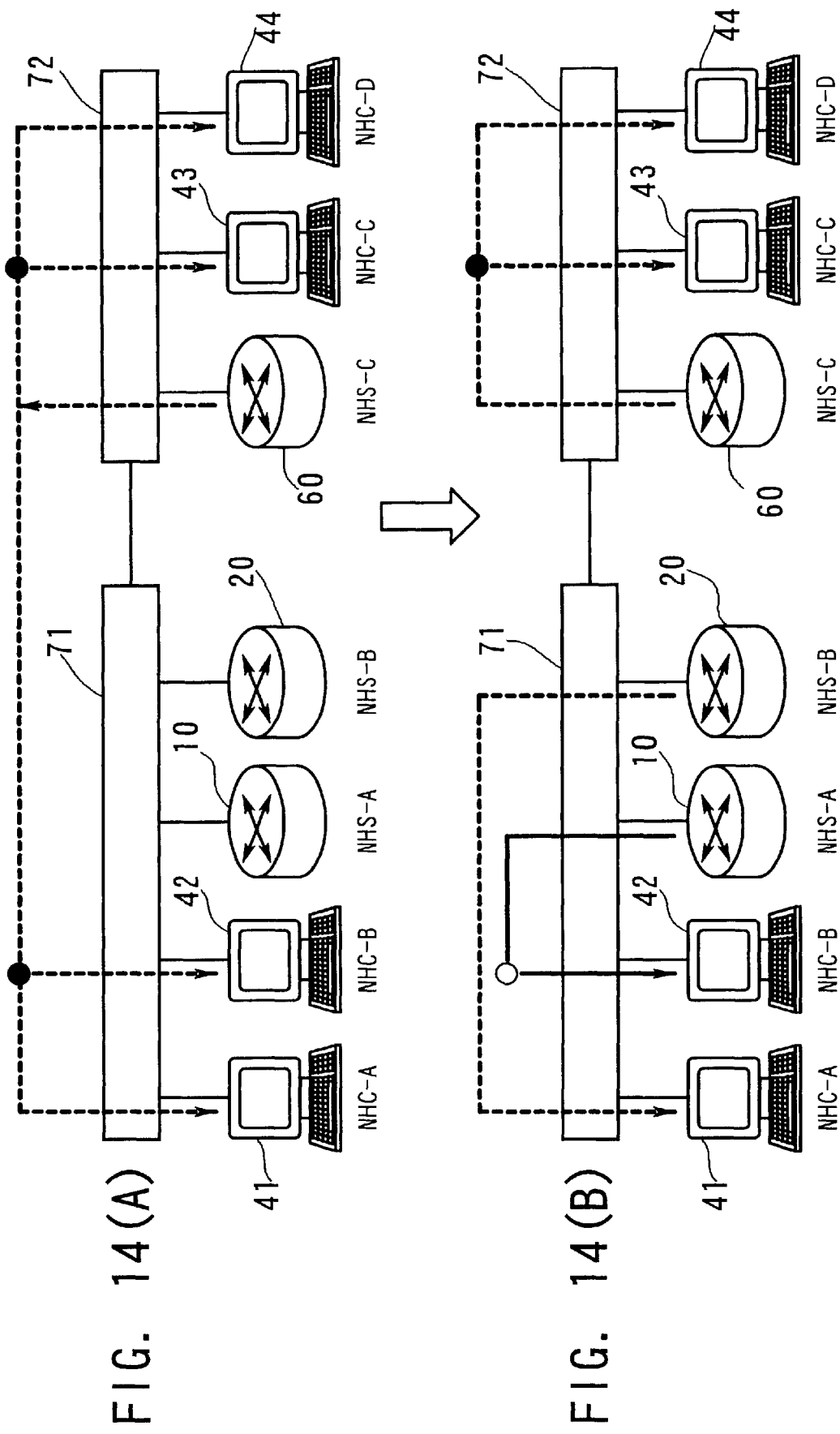
FIG. 14(A) is a diagram which shows a network system according to a seventh embodiment of the present invention, where the initial server-terminal associations are illustrated.
FIG. 14(B) is a diagram which shows the network system of the seventh embodiment, where new server-terminal associations are illustrated.

FIGS. 14(A) and 14(B) show a network system according to the seventh embodiment. More particularly, FIG. 14(A) illustrates the initial state of server-terminal associations, while FIG. 14(B) shows another situation where the server-terminal associations are changed. Since this seventh embodiment has basically the same configuration as the second embodiment, the following section will focus on its distinctive points, while affixing like reference numerals to like elements.

Initially, all the terminals (NHC-A, NHC-B, NHC-C, NHC-D) 41, 42, 43, and 44 are associated with the address server (NHS-C) 60 as indicated by broken arrows. The other address servers (NHS-A, NHS-B) 10 and 20 have no terminal associations. The terminals (NHC-A, NHC-B) 41 and 42 and the address servers (NHC-A, NHS-B) 10 and 20 are connected to an ATM switch 71, while the terminals (NHC-C, NHC-D) 43 and 44 and the address server (NHS-C) 60 are connected to another ATM switch 72.

It is undesirable, however, for any server-terminal connection to extend across the two different ATM switches 71 and 72, since such a connection imposes a high processing load on the ATM switches 71 and 72. In the seventh embodiment, the server-terminal associations are reconfigured so that no such connections will appear in the system.

FIG. 15 shows an example of an address translation table describing address servers and terminals on the network system of FIGS. 14(A) and 14(B). Referring to this FIG. 15, together with FIG. 14(A), the following section will describe how the address servers will modify their server-terminal associations.

First, the address servers (NHS-A, NHS-B, NHS-C) 10, 20, and 60 obtain ATM addresses of all terminals and servers on the same network by consulting their address translation table of FIG. 15. The servers then examine the Network Prefix field of each ATM address entry of the table to find out a group of address servers that share the same Network Prefix field values. If such a group is found, then the servers identify the terminals that have the same Network Prefix field values as the above address servers', but are registered actually to other address server(s) having different Network Prefix field values. In the present example of FIG. 15, two terminals (NHC-A, NHC-B) 41 and 42 meet the above criteria.

Next, the servers sort the members of the above-mentioned group of address servers by ATM address values in descending order, and after that, they select the first two address servers from among the group. In the present example, the address servers (NHS-A, NHS-B) 10 and 20 are identified as being relevant.

Here, the address translation table of FIG. 15 shows that the address server (NHS-B) 20 has a larger ATM address than the other address server (NHS-A) 10. This ATM address of the address server (NHS-B) 20 is then compared with the ATM addresses of the two terminals (NHC-A, NHC-B) 41 and 42 extracted earlier. The servers now choose such terminals that have larger ATM address values than the address server (NHS-B) 20's, and then combine those terminals with the address server (NHS-A) 10. There may be a plurality of such terminals in general, but in the present example, the terminal (NHC-B) 42 is chosen and combined with the address server (NHS-A) 10. On the other hand, the remaining terminals with smaller ATM address values than the address server (NHS-B) 20's are combined with the other address server (NHS-B) 20. While a plurality of such terminals may exist in general, the terminal (NHC-A) 41 is chosen in the present example, and combined with the address server (NHS-B) 20.

The servers then redefine their server-terminal associations in accordance with the combinations determined above. That is, the address server (NHS-A) 10 registers the terminal (NHC-B) 42 as its associated client, while the address server (NHS-B) 20 enters the terminal (NHC-A) 41 as its associated client. The address server (NHS-C) 60, on the other hand, deregisters the terminals (NHC-A, NHC-B) 41 and 42 from its group. In this way, the address servers redefine their server-terminal associations, thus solving the problem of inappropriate connections extending across a plurality of ATM switches. In addition to this advantage, the seventh embodiment allows the ATM switches to consolidate their internal connections, as well as permitting the address servers to establish connections in a distributed manner.

Now, the next section will describe an eighth embodiment of the present invention.

Figure 16:
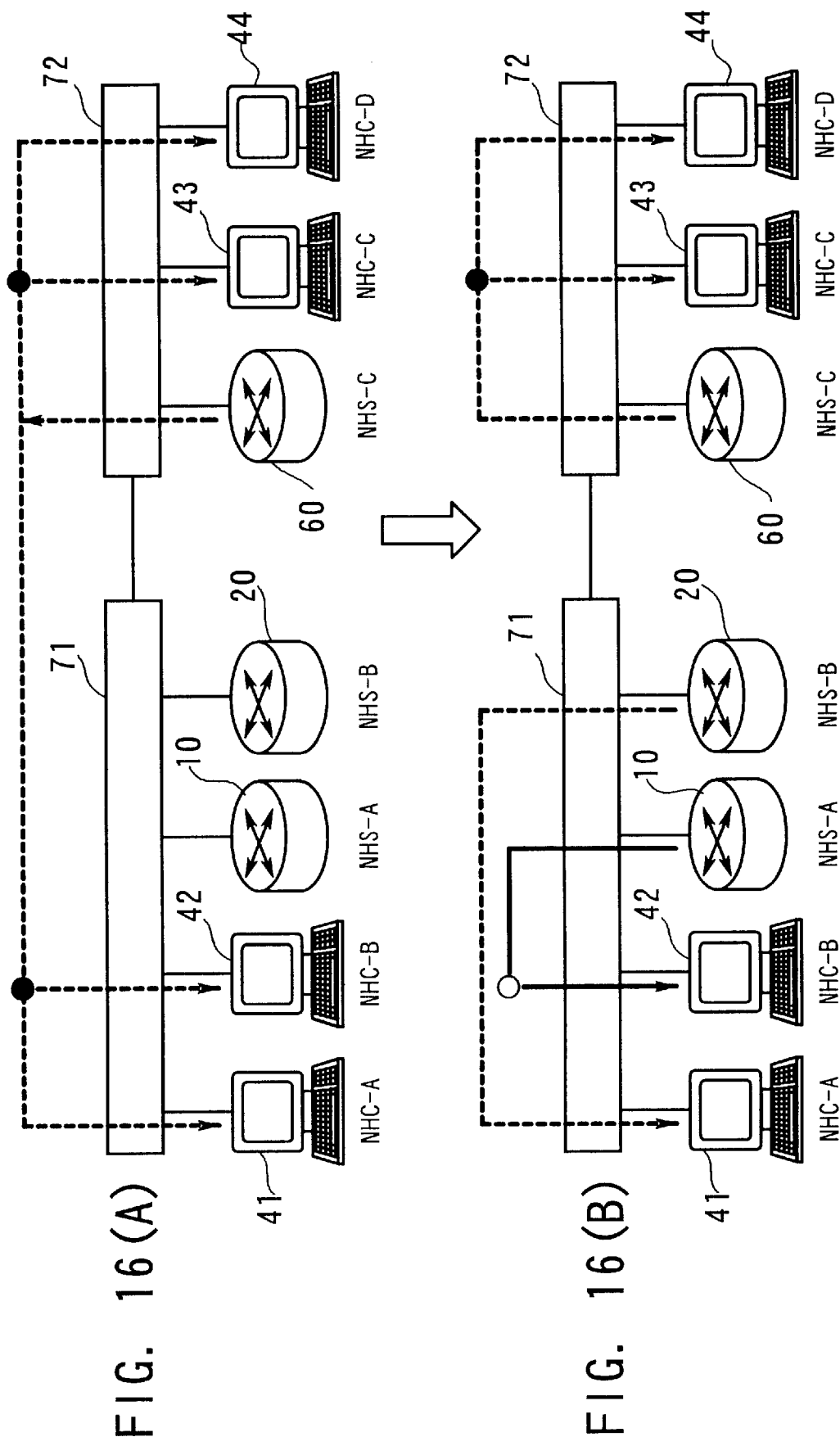
FIG. 16(A) is a diagram which shows a network system according to an eighth embodiment of the present invention, where the initial server-terminal associations are illustrated.
FIG. 16(B) is a diagram which shows the network system of the eighth embodiment, where new server-terminal associations are illustrated.

FIGS. 16(A) and 16(B) show a network system according to the eighth embodiment. More particularly, FIG. 16(A) illustrates the initial state of server-terminal associations, while FIG. 16(B) shows another situation where the server-terminal associations are changed. Since this eighth embodiment has basically the same configuration as the seventh embodiment, the following section will focus on its distinctive points, while affixing like reference numerals to like elements.

FIG. 17 shows an example of an address translation table describing address servers and terminals on the network system of FIGS. 16(A) and 16(B). This table has an extra column to record the number of terminals being associated with each address server. Referring now to this FIG. 17, together with FIG. 16(A), the following section will describe how the address servers will modify their server-terminal associations.

First, the address servers (NHS-A, NHS-B, NHS-C) 10, 20, and 60 obtain the number of terminals registered in each address server, in addition to the ATM addresses of all terminals and servers on the same network, by consulting the address translation table of FIG. 17. The servers then examine the Network Prefix field of each ATM address entry of the table to find out a group of address servers that share the same Network Prefix field values. If such a group is found, then the servers seek such terminals that have the same Network Prefix field values as the above address servers', but are registered to other address server(s) having different Network Prefix field values. In the present example, two terminals (NHC-A, NHC-B) 41 and 42 meet the above criteria.

Next, the servers sort the members of the above-mentioned group of address servers by the number of associated terminals in ascending order, and after that, they select the first two address servers from among the group. In the present context, two address servers (NHS-A, NHS-B) 10 and 20 are selected.

Here, the address translation table of FIG. 17 shows that the address server (NHS-B) 20 has a larger ATM address than the other address server (NHS-A) 10. This ATM address of the address server (NHS-B) 20 is then compared with the ATM addresses of the two terminals (NHC-A, NHC-B) 41 and 42. The servers now choose such terminals that have larger ATM address values than the address server (NHS-B) 20's and combine those terminals with the address server (NHS-A) 10. There may exist a plurality of such terminals in general, but in the present example, the terminal (NHC-B) 42 is chosen and combined with the address server (NHS-A) 10. On the other hand, the remaining terminals with smaller ATM address values than the address server (NHS-B) 20's are combined with the address server (NHS-B) 20. While a plurality of such terminals may exist in general, the terminal (NHC-A) 41 is chosen in the present example, and combined with the address server (NHS-B) 20.

The servers then reconfigure their server-terminal associations in accordance with the combinations determined above. That is, the address server (NHS-A) 10 registers the terminal (NHC-B) 42 as its associated terminal, while the address server (NHS-B) 20 registers the terminal (NHC-A) 41 as its associated terminal. The address server (NHS-C) 60, on the other hand, deregisters the two terminals (NHC-A, NHC-B) 41 and 42 from its group. In this way, the address servers redefine their server-terminal associations, thus solving the problem of inappropriate connections extending across a plurality of ATM switches. In addition to this advantage, the eighth embodiment allows the ATM switches to consolidate their internal connections, as well as permitting the address servers to establish connections in a distributed manner.

The next section will describe a ninth embodiment of the present invention.

Figure 18:
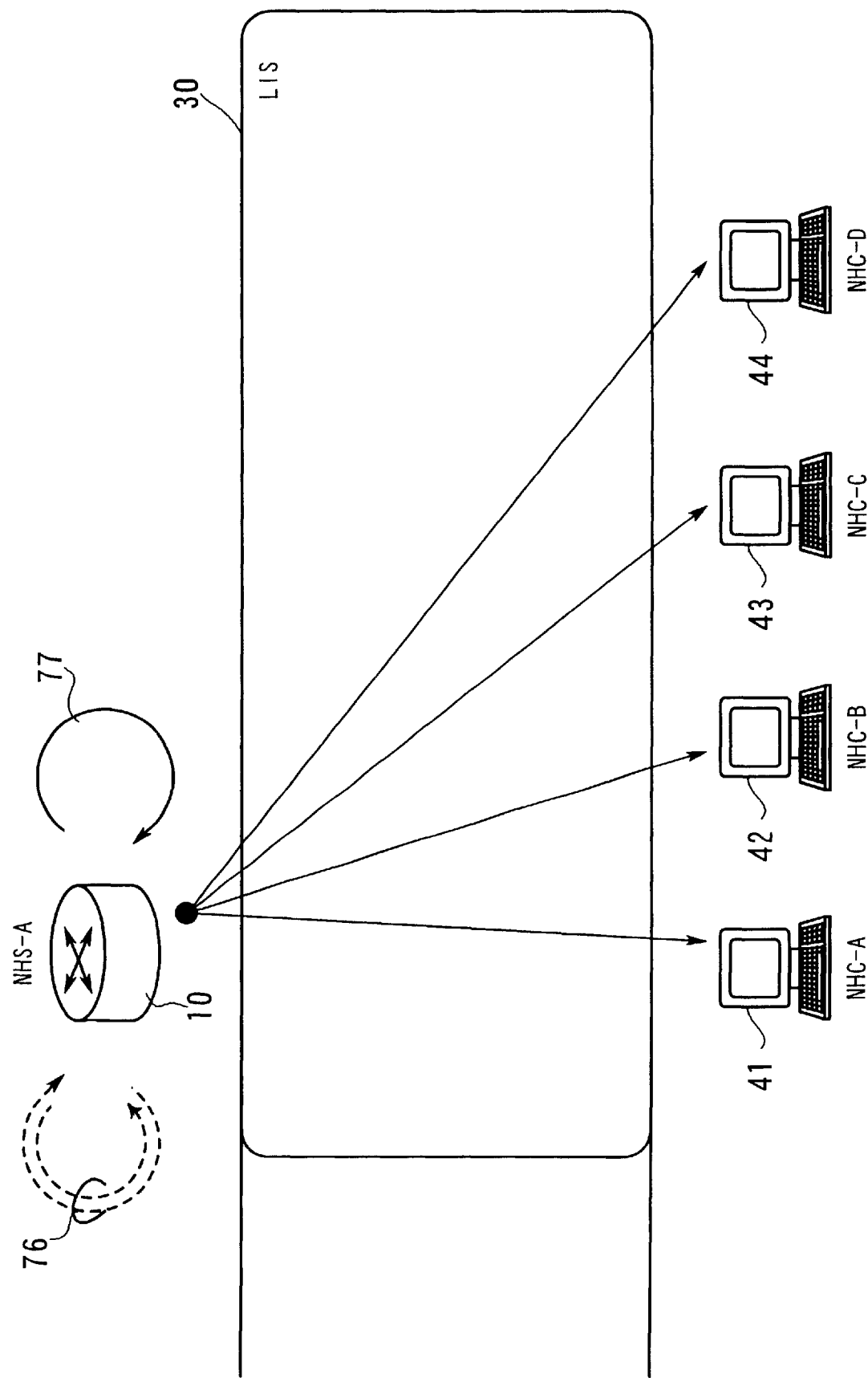
FIG. 18 is a diagram which shows a network system according to a ninth embodiment of the present invention.

FIG. 18 shows a network system according to the ninth embodiment. Since this ninth embodiment has basically the same configuration as the first embodiment, the following section will focus on its distinctive points, while affixing like reference numerals to like elements. The ninth embodiment, however, is distinguishable from the first embodiment in that the address servers can function as source terminals. This means that broadcast packets can be originated not only from terminals, but also from address servers. For example, the address server (NHS-A) 10 may send a broadcast address resolution request to itself.

Here, the address server (NHS-A) 10 has two ATM addresses: an ATM address $\alpha$ to receive normal packets, and another ATM address $\beta$ to receive broadcast packets from terminals. The address server (NHS-A) 10 prepares a connection 76 from the ATM address $\alpha$ to the same address $\alpha$. Further, it prepares another connection 77 from the ATM address $\alpha$ to the ATM address $\beta$. These connections are imaginary connections that are established within the same address server and thus require no resources, unlike the other connections extending to the terminals 41 to 44. In this way, imaginary connections are created without consuming any valuable resources in the address server.

The address server (NHS-A) 10 recognizes the presence of the above special connection looping back to itself (i.e., $\alpha$-to-$\alpha$ connection 76) by examining a connection list that collects all connections established by the address server (NHS-A) 10. Once the $\alpha$-to-$\alpha$ connection 76 is recognized, the address server (NHS-A) 10 sends an address resolution request through that connection 76 to ask an ATM address corresponding to the broadcast IP address that it owns. In response to this address resolution request, the address server (NHS-A) 10 supplies itself with its own ATM address $\beta$ with a SEL field value of "1." After receiving the response, the address server (NHS-A) 10 recognizes the presence of a $\alpha$-to-$\beta$ connection 77 by examining again the connection list that collects all connections established by the address server (NHS-A) 10. When the $\alpha$-to-$\beta$ connection 77 is recognized as being available, the address server (NHS-A) 10 sends a broadcast packet through this connection 77. In this way, the broadcasting capability is added to the existing address servers without spending any valuable connection resources, but by slightly expanding its structure.

In the above-described implementation of the ninth embodiment, the address server (NHS-A) 10 prepared two connections: $\alpha$-to-$\alpha$ connection 76 and $\alpha$-to-$\beta$ connection 77. Alternatively, the address server (NHS-A) 10 can prepare a $\beta$-to-$\beta$ connection 78, instead of the $\alpha$-to-$\beta$ connection 77, for the transmission of broadcast packets as shown in FIGS. 19(A) and 19(B). Here, FIG. 19(A) shows the $\alpha$-to-$\alpha$ connection 76; FIG. 19(B) shows the $\beta$-to-$\beta$ connection 78; FIG. 19(C) shows ATM addresses of the both endpoints of those connections.

As another valiant of the ninth embodiment, the address server (NHS-A) 10 may be configured to recognize the connections in the following way, instead of consulting its connection list. Recall that the ATM address has a format of FIG. 6. The upper part of each ATM address excluding its SEL field can uniquely identify each individual address server or terminal. It is therefore possible to find out an imaginary connection by testing the upper ATM address values of the source and destination endpoints of each existing connection. That is, if those two values coincide with each other, it indicates that the connection of interest is an imaginary connection being established within an address server.

The above-described first to ninth embodiments of the present invention have assumed the use of NHRP protocols over the network. The present invention, however, is not limited to NHRP, but can also be applied to networks operating with the "IP over ATM" protocol.

The above discussion is summarized as follows. According to the present invention, each address server is configured to have a special ATM address that is dedicated to broadcasting purposes, and the physical layer facilities of each address server handle the packets destined for this dedicated ATM address as broadcast packets. As opposed to conventional systems in which the packets should be processed at the protocol layer for distribution, the proposed configuration will greatly reduce the time required to transfer packets.

Also, the proposed address server can be linked to remote address servers, if available in the network system, to distribute broadcasting tasks. This load sharing system reduces the workload that will be imposed on each individual address server. Furthermore, the proposed address server modifies its server-terminal associations when there are inappropriate connections that extend across a plurality of ATM switches. This reconfiguration mechanism eliminates or reduces inappropriate connections, thus alleviating the processing load imposed on the ATM switches.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A broadcast address server deployed on a network to transmit packets to a plurality of terminals being associated therewith and the network allows the broadcast address server to communicate through a link with another broadcast address server, said broadcast address server comprising:

(a) connection set-up means for establishing a broadcast connection to the terminals on the network, based on addressing information that is maintained in the broadcast address server, said connection set-up means includes interserver connection set-up means for establishing a broadcast connection to the other broadcast address server on the network, based on the addressing information being maintained therein;

(b) address response means, responsive to an address resolution request from a source terminal that needs a physical address corresponding to a broadcast protocol address, for returning to the source terminal a dedicated broadcast physical address that is used solely to receive broadcast packets;

(c) packet transmission means for receiving a broadcast packet that the source terminal has transmitted toward the dedicated broadcast physical address, and forwarding the received broadcast packet to the terminals on the network through the broadcast connection established by said connection set-up means, said packet transmission means includes interserver packet transmission means for receiving the broadcast packet from the source terminal, and forwarding the received broadcast packet to the other broadcast address server through the broadcast connection that has been established by said inter-server connection set-up means;

(d) inter-server packet discrimination means, responsive to each received packet, for determining whether the received packet is a broadcast packet that is transferred from an inter-server packet transmission means of any other broadcast address server, and (e) another packet transmission means for forwarding the received packet to the terminals being registered, when said inter-server packet discrimination means has determined that the received packet is a broadcast packet transferred from said inter-server packet transmission means of any other broadcast address server.

2. The broadcast address server according to claim 1, wherein said inter-server packet discrimination means relies on a destination address-contained in the received packet to determine whether the received packet is a broadcast packet that has been transmitted by said inter-server packet transmission means of any other broadcast address server.

3. The broadcast address server according to claim 1, wherein:

the network allows the broadcast address server to link with one or more broadcast address servers;

the broadcast address server further comprises inter-server address request means for sending an address resolution request to the one or more broadcast address servers to request a physical address corresponding to a broadcast protocol address, requester discrimination means, responsive to each received address resolution request, for determining whether the received address resolution request is originated from any other broadcast address server, and inter-server address responding means for returning to the requesting broadcast address server a dedicated broadcast physical address that is used to receive broadcast packets, when said requester discrimination means has determined that the received address resolution request is originated from any other broadcast address server, wherein the inter-server connection set-up means establishing a broadcast connection to the other broadcast address servers, using the dedicated broadcast physical address that is received from the other broadcast address server as a response to the address resolution request, the inter-server packet discrimination means, responsive to each received packet, determining whether the received packet is a broadcast packet that is forwarded from the other broadcast address server through the broadcast connection established by said inter-server connection set-up means, and the other packet transmission means forwarding the incoming packet to the relevant group of terminals being registered, when said inter-server packet discrimination means has determined that the received packet is a broadcast packet that is forwarded from the other broadcast address server; and said address response means is activated only when said requester discrimination means has determined that the address resolution request is originated from a terminal.

4. The broadcast address server according to claim 3, wherein said requester discrimination means determines whether the received address resolution request is originated from the other broadcast address server, by examining a source address.

5. The broadcast address server according to claim 1, wherein:

the network allows the broadcast address server to link to one or more broadcast address servers which provide services to terminals being associated therewith;

the network is an ATM network on which a first ATM switch and a second ATM switch are deployed to interconnect the broadcast address servers and terminals;

each broadcast address server has an address translation table to provide ATM addresses corresponding to protocol address; and said connection set-up means comprises (a1) terminal finding means for examining Network Prefix field values of the ATM addresses contained in the address translation table to find out such a terminal that is coupled to the first ATM switch, but whose associated broadcast address server is coupled to the second ATM switch, (a2) server selection means for selecting one broadcast address server coupled to the first ATM switch from among the broadcast address servers, (a3) server-terminal association modification means for modifying the associations between the broadcast address servers and terminals so that the terminal found by said terminal finding means will be associated with the broadcast address server selected by said server selection means.

6. The broadcast address server according to claim 5, wherein said server selection means performs the selection on the basis of the ATM address value of each broadcast address server, when two or more broadcast address servers are coupled to the first ATM switch.

7. The broadcast address server according to claim 5, wherein said server selection means performs the selection on the basis of the number of terminals being associated with each broadcast address server.

8. The broadcast address server according to claim 1, wherein:

the network allows the broadcast address server to link to one or more broadcast address servers which provide services to terminals being associated therewith;

the network is an ATM network on which a first ATM switch and a second ATM switch are deployed to interconnect the broadcast address servers and terminals;

the first ATM switch is coupled to some of the terminals, but not coupled to any broadcast address server on the network;

each broadcast address server has an address translation table to provide ATM addresses corresponding to protocol address; and said connection set-up means comprises
- (a1) terminal finding means for examining Network Prefix field values of the ATM addresses contained in the address translation table to find out such a terminal that is coupled to the first ATM switch, but whose associated broadcast address server is coupled to the second ATM switch,
- (a2) server selection means for selecting one broadcast address server from among the broadcast address servers on the network;
- (a3) server-terminal association modification means for modifying the associations between the broadcast address servers and terminals so that the terminal found by said terminal finding means will be associated with the broadcast address server selected by said server selection means.

9. The broadcast address server according to claim 8, wherein said server selection means performs the selection on the basis of the ATM address value of each broadcast address server.

10. The broadcast address server according to claim 8, wherein said server selection means performs the selection on the basis of the number of terminals being associated with each broadcast address server.

11. The broadcast address server according to claim 1, wherein:

the network allows the broadcast address server to link to one or more broadcast address servers which provide services to terminals being associated therewith;

the network is an ATM network on which a first ATM switch and a second ATM switch are deployed to interconnect the broadcast address servers and terminals;

each broadcast address server has an address translation table to provide ATM addresses corresponding to protocol address; and said connection set-up means comprises
- (a1) terminal finding means for examining Network Prefix field values of the ATM addresses contained in the address translation table to find out such terminals that are coupled to the first ATM switch, but whose associated broadcast address servers are coupled to the second ATM switch,
- (a2) server combination means, activated when the terminals found by said terminal finding means are associated with two different broadcast address servers, for dividing the terminals found by said terminal finding means into two groups, and defining two server-terminal combinations by combining the two associated broadcast address servers and the two groups of terminals, and
- (a3) server-terminal association modification means for modifying the associations between the broadcast address servers and terminals in accordance with the server-terminal combinations determined by said server-terminal combination means.

12. The broadcast address server according to claim 11, wherein said server-terminal combination means determines the server-terminal combinations based on the ATM address values of each terminal and each two broadcast address server.

13. The broadcast address server according to claim 11, wherein said server-terminal combination means determines the server-terminal combinations, based on the ATM address value of each terminal, and in view of the number of terminals being associated with each of the two broadcast address servers.

* * * * *